United States Patent
Govindjee et al.

(10) Patent No.: US 10,902,340 B2
(45) Date of Patent: Jan. 26, 2021

(54) DYNAMIC TEMPLATES FOR INCREMENTAL ADDITION OF SPECIALIZED CONTENT INTO A COGNITIVE QUESTION ANSWER SYSTEM

(71) Applicant: International Business Machines Corporation, Armonk, NY (US)

(72) Inventors: Anita Govindjee, Ithaca, NY (US); Joseph Max Kaufman, Austin, TX (US); Christopher Michael Madison, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 15/005,541

(22) Filed: Jan. 25, 2016

(65) Prior Publication Data

US 2017/0213146 A1    Jul. 27, 2017

(51) Int. Cl.
*G06F 40/186* (2020.01)
*G06N 20/00* (2019.01)
*G06F 16/332* (2019.01)
*G06N 5/02* (2006.01)
*G06N 5/04* (2006.01)

(52) U.S. Cl.
CPC ......... *G06N 20/00* (2019.01); *G06F 16/3329* (2019.01); *G06F 40/186* (2020.01); *G06N 5/022* (2013.01); *G06N 5/041* (2013.01)

(58) Field of Classification Search
CPC ... G09B 5/00; G09B 5/14; G09B 7/00; G09B 3/00; G06N 99/005; G06F 17/2705; G06F 17/28; G06F 17/248; G06F 17/30011
See application file for complete search history.

(56) References Cited

U.S. PATENT DOCUMENTS

| | | | |
|---|---|---|---|
| 6,471,521 B1 * | 10/2002 | Dornbush | G09B 5/14 434/322 |
| 7,428,487 B2 | 9/2008 | Wang et al. | |
| 8,140,589 B2 | 3/2012 | Petri | |
| 8,850,306 B2 | 9/2014 | Sunderland et al. | |
| 8,965,922 B2 | 2/2015 | Kandogan et al. | |
| 9,082,309 B1 | 7/2015 | Fuka | |

(Continued)

OTHER PUBLICATIONS

Molla et al. "Question Answering in Restricted Domains: An Overview", Computational Linguistics, 2007, pp. 25.*

(Continued)

*Primary Examiner* — Li Wu Chang
(74) *Attorney, Agent, or Firm* — Stephen R. Yoder

(57) ABSTRACT

Described herein is a system and method for addition of content to a question answer (QA) system. The method may comprise retrieving, from a template store of the QA system, a template comprising one or more data fields and one or more metadata fields. The method may further comprise populating a passage field with passage information, wherein the passage field is one of the one or more data fields. The method may further comprise populating a training field with training information, wherein the training field is one of the one or more metadata fields. The method may further comprise ingesting, into a corpus of the QA system, a completed template comprising a populated passage field and a populated training field into the corpus.

14 Claims, 4 Drawing Sheets

(56) References Cited

U.S. PATENT DOCUMENTS

| | | |
|---|---|---|
| 2004/0191744 A1* | 9/2004 | Guirguis .................. G09B 5/00 |
| | | 434/322 |
| 2006/0253783 A1 | 11/2006 | Vronay et al. |
| 2007/0198516 A1 | 8/2007 | Ramachandran et al. |
| 2009/0162824 A1* | 6/2009 | Heck ...................... G06N 3/004 |
| | | 434/322 |
| 2011/0179045 A1 | 7/2011 | Caldwell et al. |
| 2011/0235128 A1* | 9/2011 | Sisco .................. H04N 1/3878 |
| | | 358/3.28 |
| 2014/0222822 A1 | 8/2014 | Jenkins et al. |
| 2014/0324501 A1 | 10/2014 | Davidow et al. |
| 2014/0365518 A1 | 12/2014 | Calo et al. |
| 2015/0143210 A1 | 5/2015 | Lam |
| 2017/0032251 A1* | 2/2017 | Podgorny ............ G06Q 40/123 |

OTHER PUBLICATIONS

Kelly, et al., "User-Centered Evaluation of Interactive Question Answering Systems", Proceedings of the Interactive Question Answering Workshop at HLT-NAACL, 2006, 8 pages.

Antonino, et al., "The Parameterized Safety Requirements Templates", 8th International Symposium on Software and Systems Traceability, 2015, 7 pages.

Frank, et al., "Question Answering From Structured Knowledge Sources", Journal of Applied Logic 5 (2007) 20-48, 2007, 29 pages.

* cited by examiner

DYNAMIC TEMPLATES FOR INCREMENTAL ADDITION OF SPECIALIZED CONTENT INTO A COGNITIVE QUESTION ANSWER SYSTEM

BACKGROUND

Embodiments described herein generally relate to the field of computers, and more particularly to question answer systems.

Computerized databases and the connectivity provided by the Internet has made an almost overwhelming amount of information available for search by users such as students, research scientists, or anyone else with access to a computing device. Question answer (QA) systems have been developed to assist such searches, which may take an input question, analyze it, and return results indicative of the most probable answer to the input question. QA systems provide automated mechanisms for searching through large sets of data, and analyze them with regard to an input question to determine an answer to the question. The quality of the answers provided by a QA system and the amount of time it takes to provide answers can be highly dependent on the content and the amount of available content.

SUMMARY

In some embodiments, a method for addition of content to a question answer (QA) system may be provided. The method may comprise retrieving, from a template store of the QA system, a template comprising one or more data fields and one or more metadata fields. The method may further comprise populating a passage field with passage information, wherein the passage field is one of the one or more data fields. The method may further comprise populating a training field with training information, wherein the training field is one of the one or more metadata fields. The method may further comprise ingesting, into a corpus of the QA system, a completed template comprising a populated passage field and a populated training field into the corpus.

In some embodiments, a question answer (QA) system is provided comprising a memory; and a processor coupled to the memory, the processor configured to: retrieve, from a template store of the QA system, a template comprising one or more data fields and one or more metadata fields; populate a passage field with passage information, wherein the passage field is one of the one or more data fields; populate a training field with training information, wherein the training field is one of the one or more metadata fields; and ingest, into a corpus of the QA system, a completed template comprising a populated passage field and a populated training field into the corpus.

In some embodiments, a computer program product for addition of content to a question answer (QA) system is provided, the computer program product comprising a computer readable storage medium having program instructions embodied therewith, the program instructions executable by a processor to cause the processor to: retrieve, from a template store of the QA system, a template comprising one or more data fields and one or more metadata fields; populate a passage field with passage information, wherein the passage field is one of the one or more data fields; populate a training field with training information, wherein the training field is one of the one or more metadata fields; and ingest, into a corpus of the QA system, a completed template comprising a populated passage field and a populated training field into the corpus.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. Well-known instruction instances, protocols, structures, and techniques have not been shown in detail in order not to obfuscate the description.

Described herein are embodiments of a question answer (QA) system that may be configured to receive templates created using a template management system. A template author may create a template for entering content in a structured format for inclusion in a corpus of the QA system The template may provide fields for users to enter data, and fields for users to enter metadata. The metadata may be used to train the QA system. For example, the metadata may include a question, while the data may include passage information used in answering the question. Thus, the template may contemporaneously introduce both data for the corpus and training questions.

Figure 1:
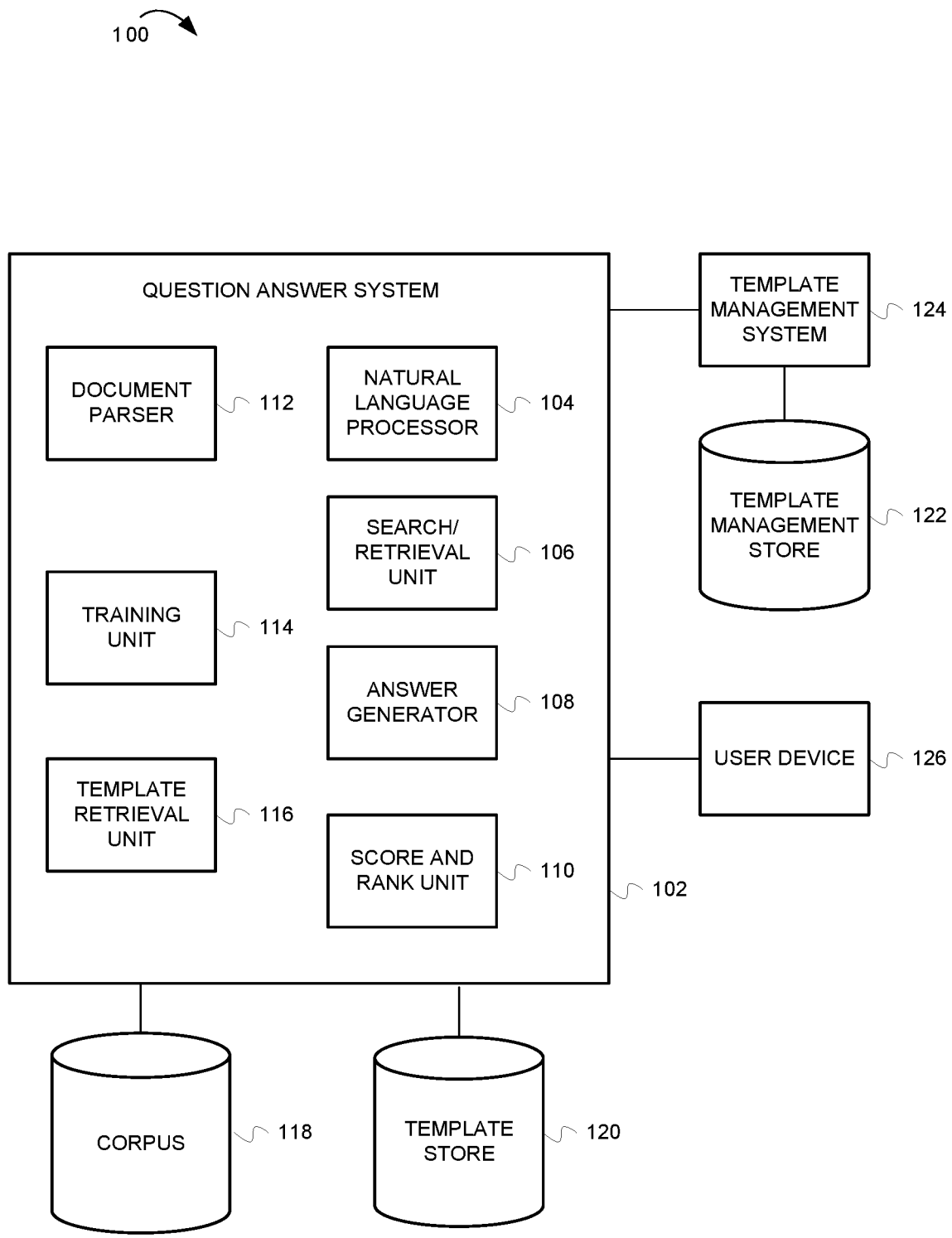
FIG. 1 is a block diagram of an embodiment of a system for creating and using dynamic templates with a question and answer system.

FIG. 1 is a block diagram of an embodiment of a system 100 for creating and using dynamic templates with a question and answer system. System 100 may comprise a QA system 102, a corpus 118, a template management system 124, a template management store 122, and a user device 126. Q/A system 102 may be communicably coupled with user device 126 and template management system 124 via one or more networks. The networks may be any type of network or collection of networks, including local area networks, metropolitan area networks, personal area networks, intranets, or the Internet.

Corpus 118 may include a collection of documents and/or other data used in answering questions posed to the QA system 102. The documents may include files, database objects, or other data containers that include text or other information that may be used to answer questions posed to the QA system 102. Answers to questions posed to the QA system 102 may be referred to as passages. The content of the corpus 118 may be primarily textual in nature, as in the case of electronic journal articles. While the primary content in the documents may be textual in nature, the documents may include other forms of content having associated text. For example, a document may have primarily graphical content, with metadata in text form that describes the graphical content. In some embodiments, the corpus 118 may be focused on a particular domain. For example, a corpus 118 that is focused on a health care domain may be dedicated to documents that contain information relevant to health care. A corpus 118 that is focused on travel information may contain documents that contain information relevant to travel logistics and destinations. While the corpus 118 may be dedicated to a particular domain, the aspects of the disclosure are not limited to any particular domain.

As will be appreciated from the above, the answers provided by the QA system 102 may depend on the content available in the corpus 118. Documents may be added to the corpus 118 in order to update or improve the available content. In an embodiment, documents and/or other data may be added to corpus 118 in large quantities. In some embodiments, a document parser 112 may process and analyze a document that has been identified for addition to the corpus 118. Document parser 112 may parse the document according to the format of the document (e.g., Portable Document Format (PDF), Hypertext Markup Language (HTML), word processing document (Microsoft® Word etc.)) to determine unique words or other relevant content in the document.

After documents are added to the corpus 118, the QA system 102 may need to be trained to associate the documents with questions that may be posed to QA system 118. A user device 126 may interact with training unit 114 to train the QA system 102. The user may enter a question in the training unit 114 and then associate documents and passages from corpus 118 with the question. In this embodiment, the user may manually enter many questions and associate them with documents in the corpus that answer the questions.

In an embodiment, a template author may access a template management system 124. The template author may create a template for substantially simultaneously ingesting passages and questions to the corpus 118. While the template author is developing the template, the template may be stored in template management store 122. Various versions of the template may be stored in template management store 122 and edited as required. Once the template has been finalized, it may be published to the QA system 102 and stored in template store 120. Templates may be used for ingesting semantically and/or structurally similar documents into the corpus 118 without requiring additional time for training the QA system 102. The template may provide metadata fields to identify a topic of the template and/or training information (e.g. questions) for training the QA system 102. The template may include passages from various documents and metadata that identifies questions related to the passages. The metadata may also include a topic of the questions and passages to be ingested. The template may be structured to allow a template user to enter content in a structured format for ingestion into the corpus 118.

A template user may access QA system 102 via user device 126. The template user may retrieve a template from template store 120. The template may be selected based upon the type of information that is to be added to corpus 118. The template user may complete the template by filling in data fields and/or metadata fields of the template. When the template user has completed filling out the template, the template may be uploaded to corpus 118. The information provided in the completed template (e.g., a question and answer) may immediately be available in a trained state in corpus 118. In other words, the template's passage and associated question are available for QA system users after the QA system 102 ingests the template into the corpus 118. After ingestion of the template, the QA system 102 needs little or no additional training to utilize the template's passages and question.

QA system 102 may receive questions from user devices (e.g., user device 126) or some other question source, and process the questions to determine answers to the questions. In some aspects, questions submitted to the QA system 102 may be processed as part of a pipeline that may include a natural language processor 104, a search retrieval unit 106, an answer generator 108, and a score and rank unit 110.

Natural language processor 104 may receive an input question in a natural language format and parse the question to identify entities and concepts in the question. For example, a user may input the question "is the water safe to drink in Nigeria?" The natural language processor 104 may analyze the question to identify the entities and concepts in the question.

Search retrieval unit 106 may use the entities and concepts identified by natural language processor 104 to generate one or more queries. The queries may be executed against the documents in the corpus 118. The queries may return a results set of documents that match the query.

Answer generator 108 may analyze the documents in the results set and suggest text from the documents in the results set that may be used as potential answers to the question.

Score and rank unit 110 determines a score for the potential answers, and ranks the potential answers by the determined score. In some aspects, separate scores may be determined based on how well a potential answer matches the entities in the question, the concepts in the question, and the context of the question. The separate scores may be optionally weighted and combined to produce an overall score. The overall score can then be used to rank the potential answers. The top ranking answer or answers can then be returned in response to the user's question.

In the description above, the natural language processor 104, search retrieval unit 106, answer generator 108, and score and rank unit 110 have been described as discrete entities. Similarly, the document parser 112, training unit 114, and template retrieval unit 116 have been described as discrete entities. It should be noted that the processing and functionality of these entities may be combined, and further that the processing and functionality may be distributed differently than described above. For example, the functionality provided by the document parser 112 may be incorporated into the training unit 114.

Further details on the operation of system 100 are provided below with respect to FIGS. 2 and 3.

Figure 2:
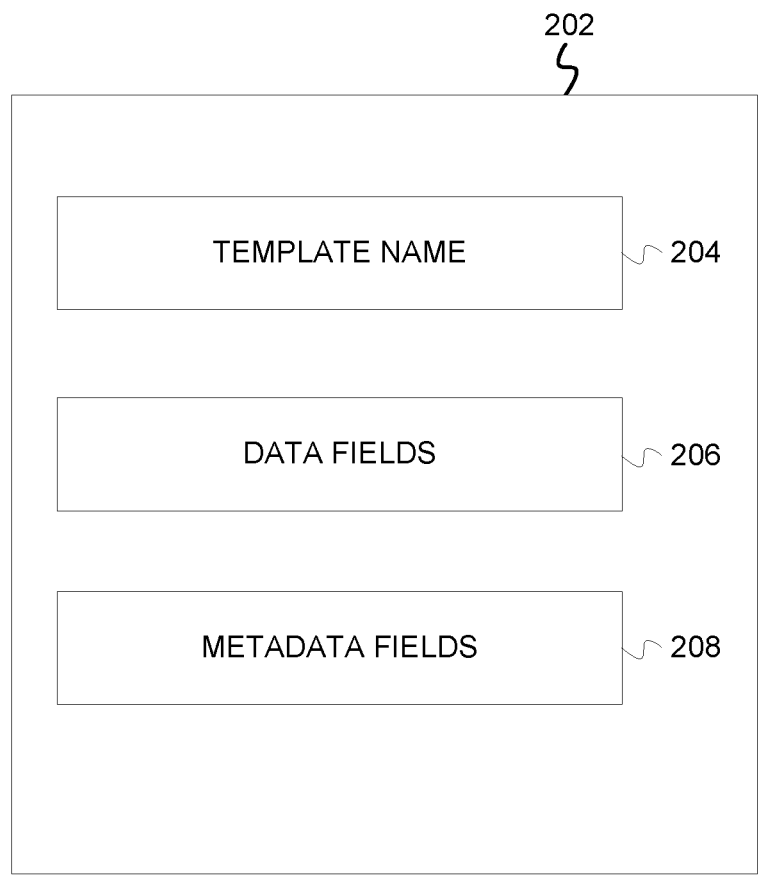
FIG. 2 is a block diagram of an embodiment of a dynamic template.

FIG. 2 is a block diagram of an embodiment of a dynamic template 202.

Dynamic template 202 may include a template name field 204, data fields 206, and metadata fields 208. Template name 204 may be selected by a template author to describe the content of the template. In some embodiments, templates may be searched for using their name or other identifying information. Data fields 206 may comprise various data fields to be completed by a template user. The data fields 206 may be configured to receive template user input as passages to answer questions posed to QA system 102. Metadata fields 208 may comprise various metadata entries. Metadata fields 208 may be configured to receive information used to identify a topic of the template. Further, metadata fields 208 may be configured to receive one or more training questions for use in training the QA system 102. The data fields 206 and metadata fields 208 may have required formats for completing the fields. In some embodiments, information entered into the data fields 206 and metadata fields 208 may be verified for proper format before entry of the completed template into a corpus.

In an embodiment, data fields 206 may contain one or more attribute fields related to a passage and/or topic of the template. Data fields 206 may also contain a field for a passage, which may be referred to as a passage answer unit (pau). Metadata fields 208 may contain fields for training information, for example, one or more questions related to the pau. Metadata fields 208 may also contain a pau_id field used to identify one or more topics of the template.

An embodiment of a sample template may be:

```
{
attributes{
    Attribute1: "",
    Attribute2: "",
    Attribute3: "",
},
pau_id: "Topic1 : ${Attribute1} : ${Attribute2}",
pau: "",
training: {
    questions: ["Is the $Attribute2 to $Attribute3 in $Attribute1?",
        "I'm traveling to $Attribute1, is the $Attribute2 to $Attribute3"}
    }
}
```

An embodiment of a completed sample template as described above may be:

```
{
attributes{
    Attribute1: "sample1",
    Attribute2: "sample2",
    Attribute3: "sample3",
},
pau_id: "Topic1 : Sample1 : Sample2",
pau: "The water is safe to drink in United States, There is no need to carry
bottled water with you.",
training: {
    questions: ["Is the Sample2 to Sample3 in Sample1?",
        "I'm traveling to Sample1, is the Sample2 to Sample3"}
    }
}
```

As shown in the preceding sample, in some embodiments, a template user may complete the attributes portion and the pau portion of a template. Based on the entries made by the template user, other fields (e.g., the pau_id and training questions) may be automatically populated based on information entered in the attributes fields. In the preceding sample, the attributes and pau may be considered part of the data fields 206 and the pau_id and training fields may be part of metadata fields 208. In other embodiments, all or any portion of the data fields 206 and metadata fields 208 may be manually completed by a template user and/or automatically populated by the QA system.

Figure 3:
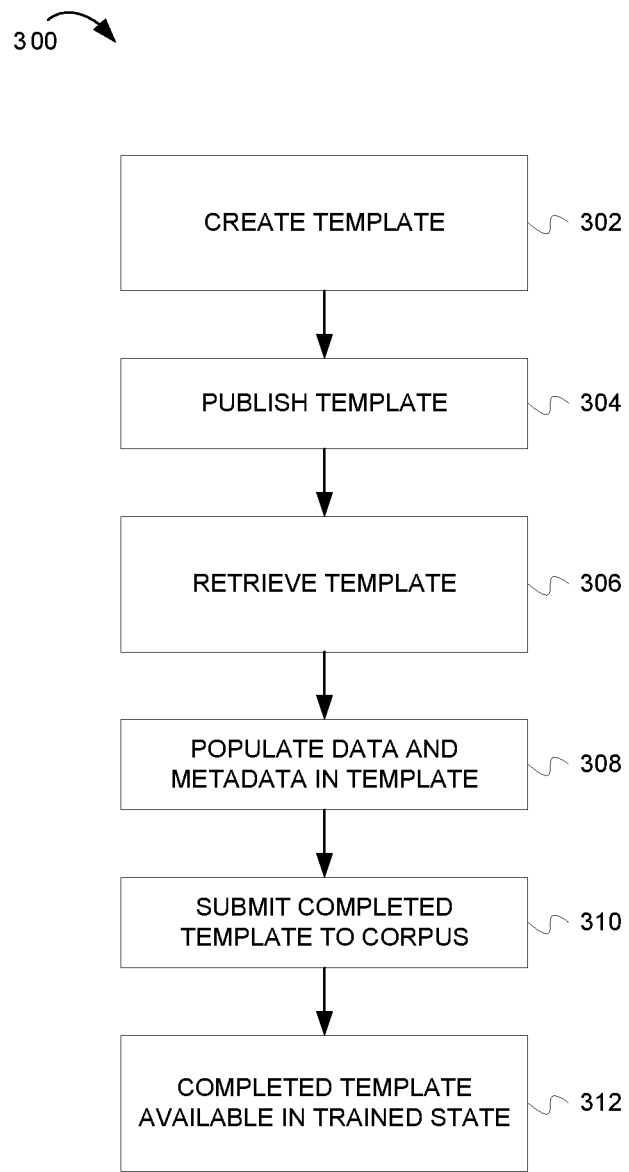
FIG. 3 is a flow chart of an embodiment of creation and use of dynamic templates.

FIG. 3 is a flow chart of an embodiment of creation and use of dynamic templates 300. The creation and use of dynamic templates 300 may begin at block 302 with a template author creating a template (e.g., dynamic template 202) by accessing template management system 124. Working versions of the template may be stored in template management store 122 while developing the template at block 302. After the template is created using the template management system 124, the template may be published to a QA system 102, at block 304. At block 306, a template user may retrieve the template from template store 120 of the QA system 102 using template retrieval unit 116. A number of templates may be stored in template store 120. Retrieving the template from the template store 120 may include searching through the templates stored in template store 120. At step 308, the template user may complete the template using user device 126 by populating data fields and metadata fields of the template. At step 310, the completed template may be submitted to the QA system 102 and ingested into the corpus by training unit 114 or some other component of QA system 102. When the completed template is submitted to the QA system 102, a passage and a corresponding question cluster may be created in the QA system by training unit 114 or some other component of QA system 102. At step 312, the data and metadata from the template may be immediately available in a trained state in corpus 118.

In an example embodiment, a travel company may utilize a QA system for providing travel guides. The QA system may receive a question inquiring whether or not drinking water is safe to drink at a particular destination. In this case, template management system may have been utilized to create a country water guide template for use in ingesting questions and passages related to the safety of drinking water at particular destinations. The QA system may receive the question "is the water safe to drink in Nigeria?" Different implementations of QA system functionality may operate differently. In a QA system implementing a descriptive pipeline, the search/retrieval unit may find results in the corpus related to "water", but information related to water in other countries may be returned with a higher confidence if those questions are asked more frequently. The QA system utilizing a descriptive pipeline may search the passages in the corpus for relevant keywords, concepts, and or natural language processor attributes retrieved from the posed question, thus all passages related to water and/or Nigeria may be retrieved as possible answers. Topic answer oriented (TAO) pipeline QA systems, may leverage stored topics for finding a passage. Thus passages may be grouped together under topics. With the Nigeria water question, there may be a hit on the term "water" in the corpus.

The results may not be very accurate if the topics in the TAO pipeline QA system are:
Topic: Nigeria: country guide: water
Topic: United States: country guide: water The results may not be accurate if the QA system was previously trained with the question "is the water safe to drink in the United States?" and not the question "is the water safe to drink in the United States?" When the question about water in Nigeria is asked, the answer for the United States may be returned with a higher confidence. Higher accuracy with a TAO pipeline QA system may be achieved by training for each country and water. E.g. "is the water safe to drink in Nigeria?"; "is the water safe to drink in the United States?"; etc.

A template may be created that includes attribute fields that identify a particular country and text related to the answer to the question. The template may also contain metadata fields that identify the topic of the template and the questions associated with the topic. In this case, the information in the data fields may be moved directly to the corpus via incremental ingestion and training with the metadata questions. Continuing the drinking water example, a template may be created with data fields for "country name"; "city"; and "text." The text field may indicate the quality of drinking water at the location identified by the country and city fields. The metadata fields used by the template may include a topic, for example, "country"; city (optional)"; country guide; water. The training question may be: is water safe to drink in (country)? The templates may be completed with specific information on a country by country basis. The template may be ingested by the QA system, providing the information from the documents and training the QA system using the single template.

A sample template from the drinking water example may be:

```
{
attributes{
    country: "",
    target: "",
    verb: "",
},
pau_id: "Travel Guide : ${country} : ${target}",
pau: "",
training: {
    questions: ["Is the $target to $verb in $country?",
        "I'm traveling to $country, is the $target to $verb"]
    }
}
```

A completed template for the united states may be:

```
{
attributes{
    country: "United States",
    target: "water safe",
    verb: "drink",
},
pau_id: "Travel Guide : United States : water safe",
pau: "The water is safe to drink in United States, There is no need to carry
bottled water with you.",
training: {
    questions: ["Is the water safe to drink in United States?",
        "I'm traveling to United States, is the water safe to drink"]
    }
}
```

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
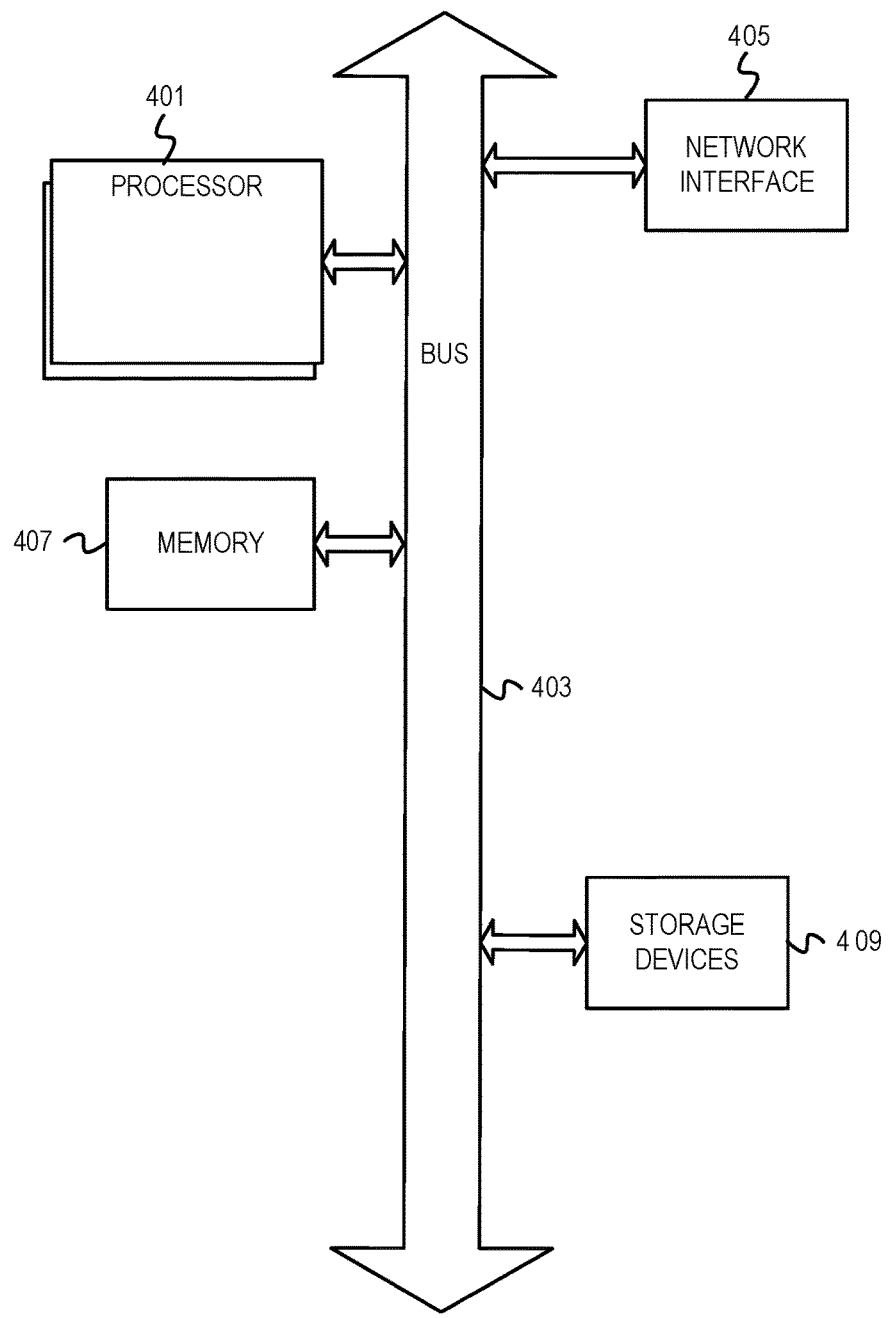
FIG. 4 is a block diagram of an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for adding content to an electronic question answer (QA) system that provides answers to questions posed in natural language format, the method comprising:
   creating a template for ingesting semantically similar documents into a corpus of the electronic QA system, wherein the created template facilitates importing or entering content in a structured format for inclusion in a corpus of the electronic QA system;
   storing the created template in a template store;
   training the electronic QA system by associating documents and passages from the corpus of the electronic QA system with one or more questions according to a set of training data, wherein the training data includes associations between one or more questions and one or more documents or passages;
   retrieving, from the template store of the electronic QA system via one or more processors, a template comprising a passage field, a training field and one or more metadata fields indicating a first question;
   populating, via the electronic QA system, the passage field with an answer to the first question;
   populating, via the electric QA system, a training field of the one or more metadata fields with a generic form of the question;
   ingesting, into the corpus of the electronic QA system, a populated version of the template comprising the populated passage field and the populated training field, wherein the ingesting results in the first question and the answer to the first question being available for answering questions without additional operations for training the electronic QA system to utilize the first question and the answer to the first question;
   receiving, by the electronic QA system via at least one of the processors, a second question;
   determining, by the electronic QA system via at least one of the processors, that the second question is similar to the first question; and
   providing, by the electronic QA system, an answer to the second question based on the populated passage field.

2. The method of claim 1, further comprising:
   creating a passage in the QA system based, at least in part, on the populated passage field; and
   creating a question cluster in the QA system based, at least in part, on the populated training field.

3. The method of claim 1, wherein the one or more metadata fields further comprises a passage identification field, the passage identification field indicating a topic of the template.

4. The method of claim 3, wherein retrieving the template is based upon the passage identification field.

5. The method of claim 1, further comprising:
populating an attribute field, wherein the attribute field is one of the one or more data fields; and
populating the training field, based at least in part, on the attribute field.

6. A question answer (QA) system comprising:
one or more processors;
one or more non-transitory machine readable media coupled to the processor, the machine readable media including instructions, which when executed by at least one of the processors, add content used by the QA system to provide answers to questions posed to the QA system, the instructions comprising:
instructions to create a template for ingesting semantically similar documents into a corpus of the electronic QA system, wherein the created template facilitates importing or entering content in a structured format for inclusion in a corpus of the electronic QA system;
instructions to train the electronic QA system by associating documents and passages from the corpus of the electronic QA system with one or more questions according to a set of training data, wherein the training data includes associations between one or more questions and one or more documents or passages;
instructions to store the created template in a template store;
instructions to retrieve, from the template store of the QA system, a template comprising a passage field, a training field, and one or more metadata fields indicating a first question;
instructions to populate the passage field with passage information including an answer to the first question;
instructions to populate the training field with training information including a generic form of the question;
instructions to ingest, into the corpus of the QA system, a populated version of the template including the populated passage field and the populated training field, wherein the ingesting causes the first question and the answer to the first question to be available for answering questions without additional operations for training the electronic QA system to utilize the first question and the answer to the first question;
instructions to receive, by the electronic QA system, a second question;
instructions to determine, by the QA system, that the second question is similar to the first question; and
instructions to provide, by the QA system, an answer to the second question based on the populated passage field.

7. The QA system of claim 6, wherein the processor is further configured to:
create a passage in the QA system based, at least in part, on the passage information; and
create a question cluster in the QA system based, at least in part, on the training information.

8. The QA system of claim 6, wherein the one or more metadata fields further comprises a passage identification field, the passage identification field indicating a topic of the template.

9. The QA system of claim 8, wherein retrieval of the template is based upon the passage identification field.

10. The QA system of claim 6, wherein the instructions further comprise:
instructions to populate an attribute field of the template; and
instructions to further populate the training field, based at least in part, on the attribute field.

11. A computer program product for addition of content to a question answer (QA) system, the computer program product comprising a non-transitory computer readable storage medium having program instructions embodied therewith, the program instructions executable by a processor to cause the processor to add content used by the QA system to provide answers to questions posed to the QA system, the instructions including:
instructions to create a template for ingesting semantically similar documents into a corpus of the electronic QA system, wherein the created template facilitates importing or entering content in a structured format for inclusion in a corpus of the electronic QA system;
instructions to train the electronic QA system by associating documents and passages from the corpus of the electronic QA system with one or more questions according to a set of training data, wherein the training data includes associations between one or more questions and one or more documents or passages;
instructions to store the created template in a template store;
instructions to retrieve, from the template store of the QA system, a template comprising a passage field, a training field, and one or more metadata fields indicating a first question;
instructions to populate the passage field with passage information including an answer to the first question;
instructions to populate the training field with training information including a generic form of the question;
instructions to ingest, into the corpus of the QA system, a populated version of the template including the populated passage field and the populated training field, wherein the ingesting causes the first question and the answer to the first question to be available for answering questions without additional operations for training the electronic QA system to utilize the first question and the answer to the first question;
instructions to receive, by the electronic QA system, a second question;
instructions to determine, by the QA system, that the second question is similar to the first question; and
instructions to provide, by the QA system, an answer to the second question based on the populated passage field.

12. The computer program product of claim 11, wherein the program instructions comprise instructions to:
create a passage in the QA system based, at least in part, on the passage information; and
create a question cluster in the QA system based, at least in part, on the training information.

13. The computer program product of claim 11, wherein the one or more metadata fields further comprises a passage identification field, the passage identification field indicating a topic of the template.

14. The computer program product of claim 11, wherein the program instructions further include instructions to:
populate an attribute field, wherein the attribute field is one of the one or more data fields; and
populate the training field, based at least in part, on the attribute field.

* * * * *